United States Patent
Fukuda

(10) Patent No.: US 7,289,872 B1
(45) Date of Patent: Oct. 30, 2007

(54) METHOD AND APPARATUS FOR PREDICTION OF POLISHING CONDITION, AND COMPUTER PRODUCT

(75) Inventor: Daisuke Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/706,212

(22) Filed: Feb. 15, 2007

(30) Foreign Application Priority Data

Sep. 12, 2006 (JP) .............................. 2006-246680

(51) Int. Cl.
*G06F 19/00* (2006.01)

(52) U.S. Cl. ....................................... 700/169; 438/692

(58) Field of Classification Search ................ 700/159, 700/169, 170, 188, 193; 438/692, 700, 745
See application file for complete search history.

(56) References Cited

U.S. PATENT DOCUMENTS

| | | | |
|---|---|---|---|
| 5,605,499 A * | 2/1997 | Sugiyama et al. ........... 451/443 |
| 6,402,589 B1 * | 6/2002 | Inaba et al. ..................... 451/5 |
| 6,930,054 B2 * | 8/2005 | Lee et al. ..................... 438/745 |
| 7,050,880 B2 * | 5/2006 | de Roover et al. ......... 700/121 |
| 7,070,477 B2 * | 7/2006 | Morisawa et al. ............. 451/5 |
| 2002/0163649 A1 * | 11/2002 | Hirose et al. ............... 356/504 |
| 2003/0207576 A1 * | 11/2003 | Ohtake et al. .............. 438/691 |
| 2004/0138838 A1 * | 7/2004 | Scheiner et al. ............. 702/64 |
| 2005/0173669 A1 * | 8/2005 | Kurata et al. .............. 252/79.1 |
| 2005/0181609 A1 * | 8/2005 | Kurata et al. ............... 438/689 |
| 2006/0106479 A1 * | 5/2006 | de Roover et al. ......... 700/121 |

FOREIGN PATENT DOCUMENTS

JP    2004-516680    6/2004

* cited by examiner

*Primary Examiner*—Leo Picard
*Assistant Examiner*—Chad Rapp
(74) *Attorney, Agent, or Firm*—Staas & Halsey LLP

(57) ABSTRACT

A polishing-condition predicting apparatus determines optimum parameters to be substituted into various function models by performing calibration by use of a TEG. A polishing condition enabling polishing of a thin film formed on a substrate to be designed so as to obtain a desirable height of the thin film and a desirable depth of a groove is predicted by simulation using the determined optimum parameters.

18 Claims, 10 Drawing Sheets

| POLISHING TIME | POLISHING ROTATIONAL SPEED | POLISHING PRESSURE | HEIGHT H |
|---|---|---|---|
| 0 | 80 | 3.0 | 400 |
| 20 | 80 | 3.0 | 180 |
| 0 | 80 | 2.0 | 400 |
| ... | | | |

| MODULE | HEIGHT H | GROOVE DEPTH S |
|---|---|---|
| MOD1 | 400 | 120 |
| MOD2 | 420 | 100 |
| ... | | |
| REGION BETWEEN MODULES | 400 | 80 |

FIG.9

| x | y | WIRING WIDTH w | WIRING INTERVAL s | HEIGHT H | GROOVE DEPTH S |
|---|---|---|---|---|---|
| 0 | 0 | 0.1 | 0.1 | 200 | 20 |
| 0 | 1 | 0.1 | 0.1 | 200 | 20 |
| ... | | | | | |
| 2 | 2 | 3.0 | 1.0 | 275 | 100 |
| ... | | | | | |
| xmax | ymax | 0.1 | 0.1 | 200 | 20 |

FIG.12

| X CO-ORDINATE OF MESH | Y CO-ORDINATE OF MESH | WIRING WIDTH w | WIRING INTERVAL s | HEIGHT H | GROOVE DEPTH S |
|---|---|---|---|---|---|
| 0 | 0 | 0.1 | 0.1 | 320 | 20 |
| 0 | 1 | 0.1 | 0.1 | 320 | 20 |
| ... | | | | | |
| 3 | 3 | 1.0 | 2.0 | 300 | -100 |
| ... | | | | | |
| xmax | ymax | 0.1 | 0.1 | 320 | 20 |

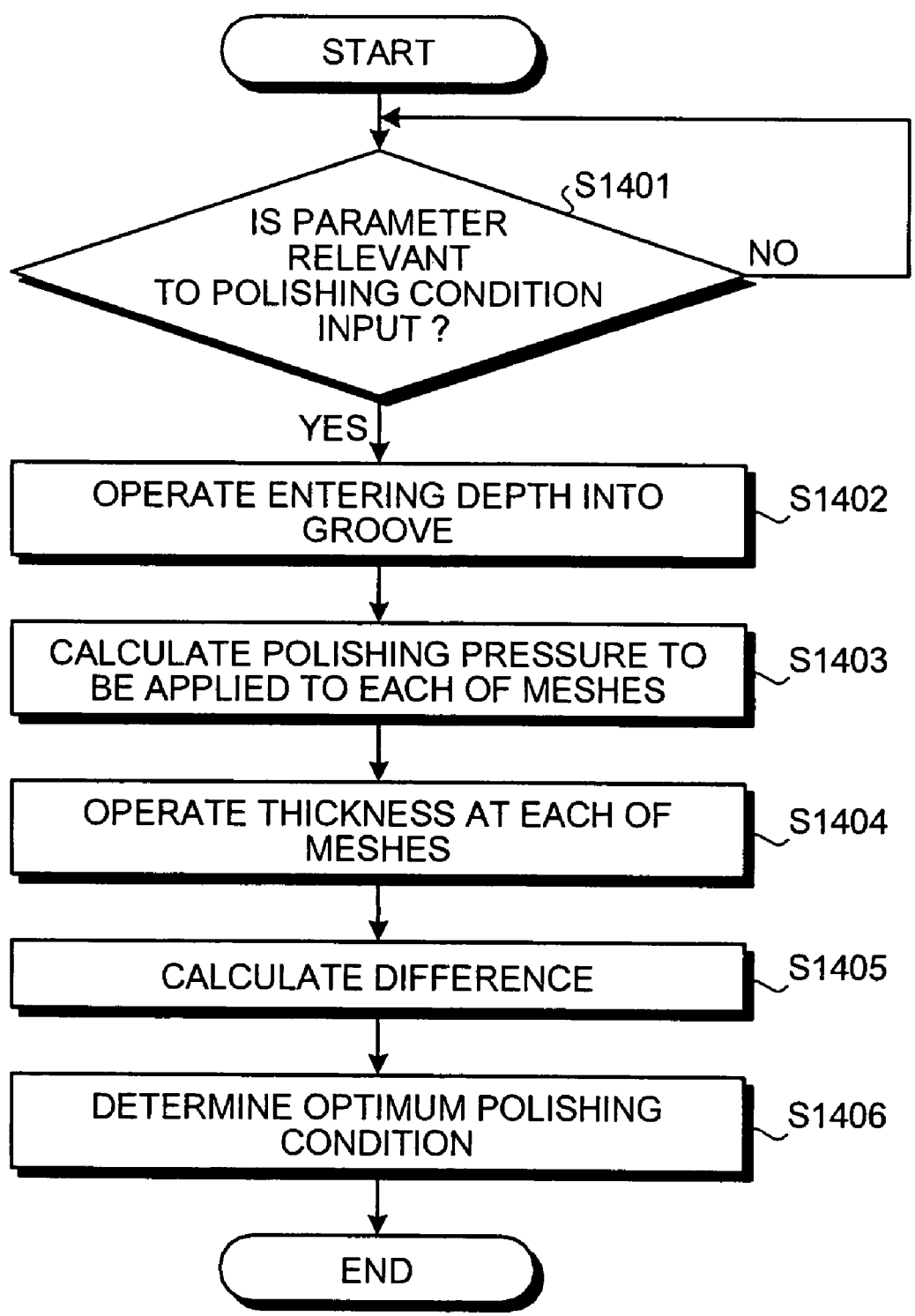

METHOD AND APPARATUS FOR PREDICTION OF POLISHING CONDITION, AND COMPUTER PRODUCT

CROSS-REFERENCE TO RELATED APPLICATIONS

This application is based upon and claims the benefit of priority from the prior Japanese Patent Application No. 2006-246680, filed on Sep. 12, 2006, the entire contents of which are incorporated herein by reference.

BACKGROUND OF THE INVENTION

1. Field of the Invention

The present invention relates to a technology of prediction of a polishing condition on which a thin film on a semiconductor device is polished.

2. Description of the Related Art

According to microfabrication and multiple layer wiring of a semiconductor device, flatness is required in each layer. Specifically, in terms of improvement of quality, it is important to polish a surface of a substrate on which copper plating or the like is applied, by a chemical mechanical planarization (CMP) or the like, to obtain uniform flatness in a wiring process in semiconductor device fabrication.

A polishing condition is important to properly polish the copper plating formed on the substrate. The polishing condition should vary according to the thickness of the copper plating. Specifically, the polishing condition is determined based on the combination of a polishing time, a polishing pressure, and a polishing rotational speed when the copper plating is polished by a polishing pad, for example.

A polishing condition for copper plating formed on a substrate is conventionally determined by using a test substrate called a test element group (TEG). For example, the TEG is polished at a certain polishing rotational speed under a certain polishing pressure, and then, the height of the copper plating formed on the substrate and the uneven depth of the copper plating are measured.

Next, calibration is carried out based on the measurement result, and then, a parameter of a simulation model in polishing prediction is extracted. A polishing condition is determined by carrying out a polishing prediction simulation by using the extracted parameter (for example, Japanese Patent Application Laid-open No. 2004-516680).

However, a series of operations are required to be repeated when the polishing pressure and the polishing rotational speed during the polishing are changed in the TEG measurement by the above conventional technique. Therefore, it requires much working time for searching an optimum polishing condition, thereby increasing the design period and labor.

An optimum polishing condition may be searched by changing only the polishing time. However, it is difficult to optimize both of the height of the copper plating formed on the substrate and the groove depth of the copper plating at the same time, thereby making it impossible to establish the optimum polishing condition.

As a result, the substrate cannot be planarized, and therefore, a short is caused in the wiring due to contact of wirings or a focus is inconveniently shifted in forming a wiring pattern, thereby reducing the yield.

SUMMARY OF THE INVENTION

It is an object of the present invention to at least solve the above invention.

A computer-readable recording medium according to one aspect of the present invention stores therein a polishing-condition predicting program for predicting a polishing condition by using a test substrate having a wiring groove formed in a predetermined shape, the polishing condition in polishing a thin film formed on a substrate by a polisher. The polishing-condition predicting program includes receiving a possible value of parameters of a wiring width in a region of interest on a thin film formed on the test substrate, the parameter values included in a groove depth function model expressing a maximum depth at which a polisher enters into the groove in the region; calculating a depth model value expressing a depth at which the polisher enters into the groove in the region and an adjacent region thereof by substituting the possible parameter and dimensional data of the wiring width into the groove depth function model; calculating a pressure to be applied to the region by substituting the model values of the region and the adjacent region into a pressure function model expressing pressure by height of the thin film in each region; calculating thickness of the thin film in the region after the polishing by substituting the calculated pressure into a speed function model expressing a polishing speed; calculating a difference between the calculated thickness and an actual thickness of the thin film measured in the region after the polishing; and determining an optimum value for the parameters of the wiring width based on a result of calculation at the calculating a difference.

A polishing-condition predicting apparatus according to another aspect of the present invention predicts a polishing condition by using a test substrate having a wiring groove formed in a predetermined shape, the polishing condition in polishing a thin film formed on a substrate by a polisher. The polishing-condition predicting apparatus includes a receiving unit that receives a possible value of parameters of a wiring width in a region of interest on a thin film formed on the test substrate, the parameter values included in a groove depth function model expressing a maximum depth at which a polisher enters into the groove in the region; a depth calculating unit that substitutes the possible parameter and dimensional data of the wiring width into the groove depth function model, to calculate a model value expressing a depth at which the polisher enters into the groove in the region and an adjacent region thereof; a pressure calculating unit that substitutes the model values of the region and the adjacent region into a pressure function model expressing pressure by height of the thin film in each region, to calculate a pressure to be applied to the region; a thickness calculating unit that substitutes the calculated pressure into a speed function model expressing a polishing speed, to calculate thickness of the thin film in the region after the polishing; a difference calculating unit that calculates a difference between the calculated thickness and an actual thickness of the thin film measured in the region after the polishing; and a determining unit that determines an optimum value for the parameters of the wiring width based on a result of calculation by the difference calculating unit.

A polishing-condition predicting method according to still another aspect of the present invention is of predicting a polishing condition by using a test substrate having a wiring groove formed in a predetermined shape, the polishing condition in polishing a thin film formed on a substrate by a polisher. The polishing-condition predicting method includes receiving a possible value of parameters of a wiring width in a region of interest oh a thin film formed on the test substrate, the parameter values included in a groove depth function model expressing a maximum depth at which a polisher enters into the groove in the region; calculating a depth model value expressing a depth at which the polisher enters into the groove in the region and an adjacent region thereof by substituting the possible parameter and dimensional data of the wiring width into the groove depth function model; calculating a pressure to be applied to the region by substituting the model values of the region and the adjacent region into a pressure function model expressing pressure by height of the thin film in each region; calculating thickness of the thin film in the region after the polishing by substituting the calculated pressure into a speed function model expressing a polishing speed; calculating a difference between the calculated thickness and an actual thickness of the thin film measured in the region after the polishing; and determining an optimum value for the parameters of the wiring width based on a result of calculation at the calculating a difference.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a table showing one example of a TEG measurement result;

FIG. 9 is a table showing one example of a data structure of an actual measurement database (DB);

FIG. 12 is a table showing one example of a data structure of a simulation DB;

FIG. 14 is a flowchart of the polishing-condition prediction process performed by the polishing-condition predicting apparatus.

DETAILED DESCRIPTION OF THE PREFERRED EMBODIMENTS

Exemplary embodiments according to the present invention will be explained in detail below with reference to the accompanying drawings.

Figure 1:
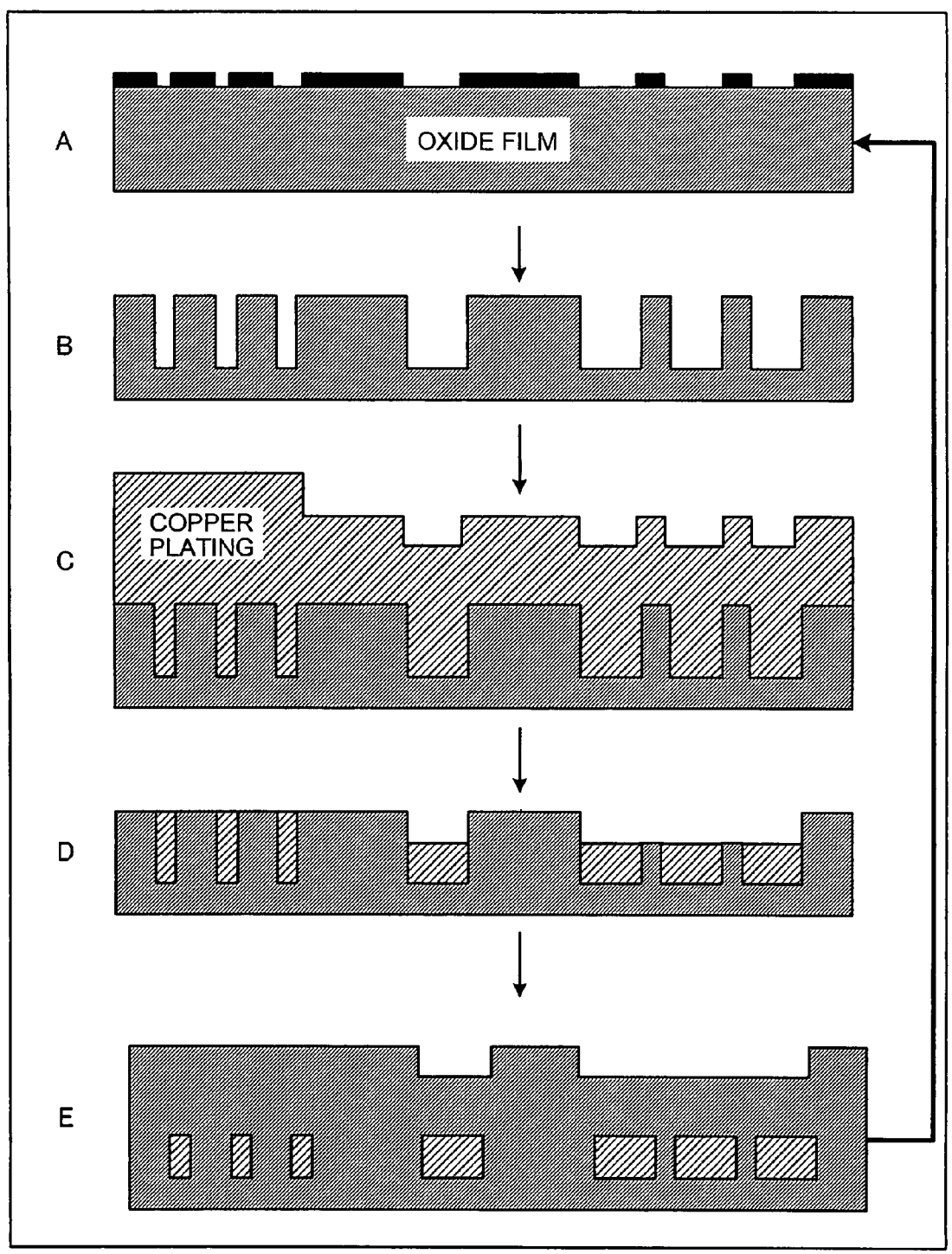
FIG. 1 is a schematic for explaining procedures of a large scale integration (LSI) fabrication process.

First, a fabricating process in fabricating an LSI serving as a semiconductor device is schematically explained below. FIG. 1 is a schematic for explaining procedures of an LSI fabricating process. As shown in FIG. 1, light is irradiated on an oxide film formed on a substrate via a photo mask in fabricating an LSI, so that a wiring pattern is formed (shown in A in FIG. 1).

The photo mask is made of a material that does not transmit light onto a transparent glass substrate, and has a wiring pattern of a semiconductor circuit depicted thereon. The wiring pattern of the semiconductor circuit can be transferred onto the oxide film by irradiating an ultraviolet ray onto the oxide film via the photo mask.

Next, a wiring groove is formed by etching the oxide film having the wiring pattern transferred thereonto (shown in B in FIG. 1). The etching signifies shaping the oxide film on the substrate by utilizing a chemical reaction (i.e., a corrosion action) of a chemical agent or an ion. Moreover, the wiring groove is adapted to form a wiring of the semiconductor circuit. The wiring is made of copper having a high electric conductivity or the like.

And then, copper plating is produced on the oxide film by electrolytic plating (shown in C in FIG. 1). The production of plating on the oxide film with copper to form the wiring is explained below. The electrolytic plating includes the reduction of a metallic ion by an electrolytic reaction and the deposition of metal on a conductive material of a cathode.

Next, the copper plating produced on the oxide film is polished by chemical mechanical polishing (CMP) or the like, so that excessive copper is removed (shown in D in FIG. 1). The CMP is a technique for grinding and planarizing an uneven surface of the substrate by the combined function of a chemical reaction and mechanical polishing by the use of a chemical polishing agent and a polishing pad.

Upon completion of the polishing, another oxide film is formed on the oxide film having the wiring formed thereon (shown in E in FIG. 1). In the case of multiple wiring, a semiconductor circuit may be multiply formed on one and the same substrate by repeating the series of processes (shown in A to E in FIG. 1).

As the semiconductor device has become finer or has more wirings in recent years, the uniform planarization of the oxide film (i.e., the surface of the substrate) is required in the process of polishing the copper plating (shown in D in FIG. 1) in the LSI fabrication. If the surface of the substrate is not properly planarized, the wiring is shorted due to a contact between the wirings or the focus is inconveniently shifted in forming the wiring pattern, thereby causing reduction of yield.

According to the present invention, a polishing condition required for uniformly planarizing the surface of the substrate can be predicted by using a simulation model that can predict variations of a polishing time, a polishing pressure, and a polishing rotational speed. In particular, the polishing condition can be accurately predicted by taking depth of the polishing pad entering into the groove in polishing the copper plating, into consideration.

Figure 2:
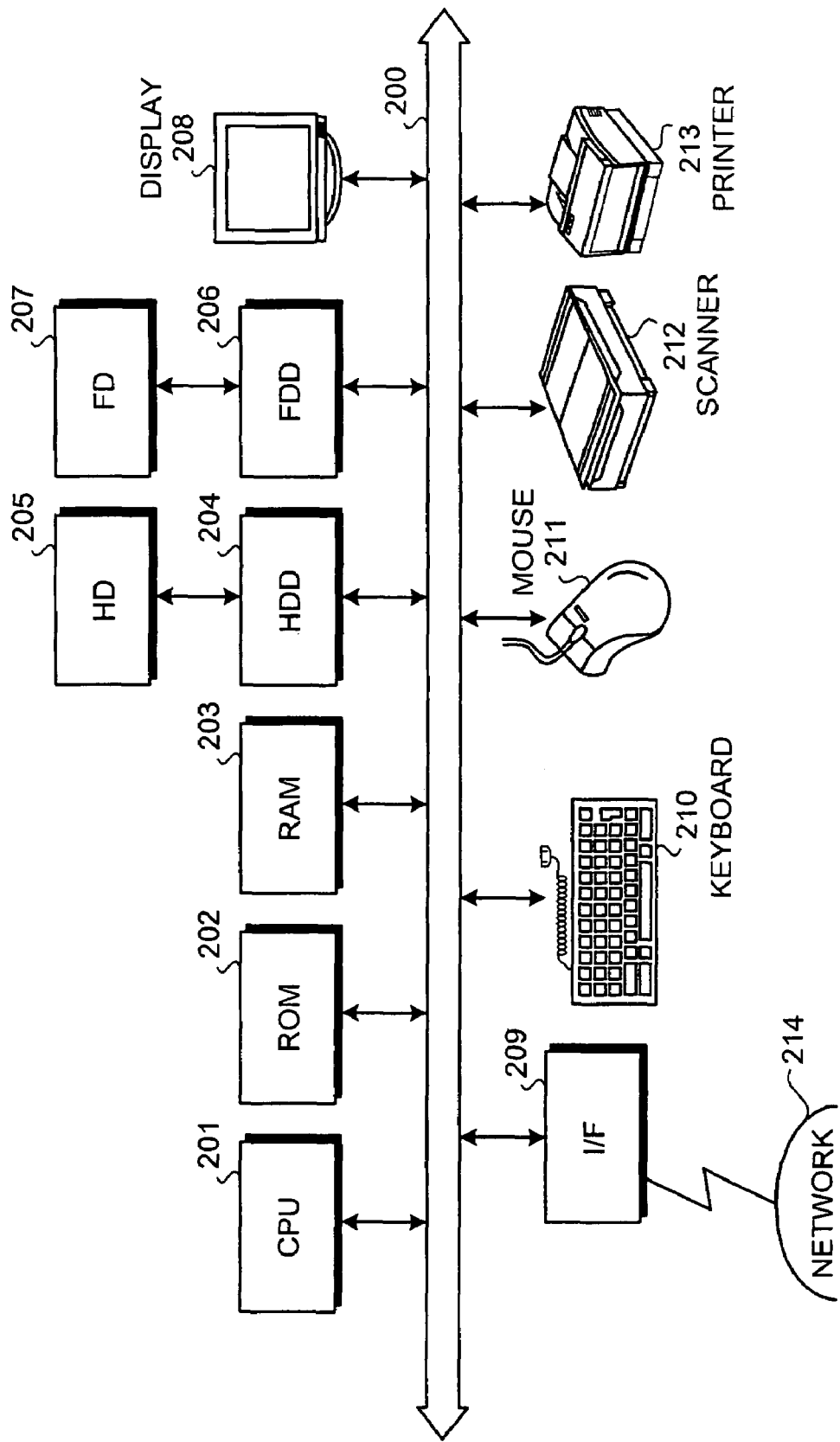
FIG. 2 is a schematic of a condition predicting apparatus according to an embodiment of the present invention.

FIG. 2 is a block diagram of a polishing-condition predicting apparatus according to an embodiment of the present invention. A shown in FIG. 2, the polishing-condition predicting apparatus includes a central processing unit (CPU) 201, a read-only memory (ROM) 202, a random-access memory (RAM) 203, a hard disk drive (HDD) 204, a hard disk (HD) 205, a flexible disk drive (FDD) 206, a flexible disk (FD) 207 as an example of a removable recording medium, a display 208, an interface (I/F) 209, a keyboard 210, a mouse 211, a scanner 212, and a printer 213. These constituents are connected to each other via a bus 200.

The CPU 201 is responsible for the control of the apparatus as a whole. The ROM 202 records a boot program and the like therein. The RAM 203 is used as work area of the CPU 201. The HDD 204 controls reading/writing data from/to the HD 205 under the control of the CPU 201. The HD 205 stores therein the data written under the control of the HDD 204.

The FDD 206 controls reading/writing data from/to the FD 207 under the control of the CPU 201. The FD 207 stores therein the data written under the control of the FDD 206 or allows the apparatus per se to read the data stored therein.

Examples of the removable recording medium may include a compact disc read-only memory (CD-ROM), a compact disc recordable (CD-R), a compact disc rewritable (CD-RW), a magneto optical (MO) disk, a digital versatile disk (DVD), and a memory card in addition to the FD 207. The display 208 is adapted to display thereon data such as a document, an image, and functional information in addition to a cursor, an icon, and a tool box. The display 208 may be a cathode ray tube (CRT), a thin-film transistor (TFT) liquid crystal display, a plasma display or the like.

The I/F 209 is connected to a network 214 such as the Internet via a communication line, and further, is connected to other apparatuses via the network 214. The I/F 209 is responsible for controlling the network 214 and the interface therein, so as to control the input/output of the data to/from an external device. The I/F 209 may be, for example, a modem or a local area network (LAN) adapter.

The keyboard 210 is provided with keys for use in inputting a character, a numeral, various kinds of instructions and the like, thereby inputting the data. The keyboard 210 may be an input pad of a touch panel type or a ten key pad. The mouse 211 moves a cursor, selects a range, moves a window or varies a size. The mouse 211 may be a trackball or a joystick that has a similar function as a pointing device.

The scanner 212 optically reads an image, and then, captures image data in the apparatus. Here, the scanner 212 may have an OCR function. Moreover, the printer 213 prints the image data or document data. A laser printer or an ink jet printer, for example, can be adopted as the printer 213.

Figure 3:
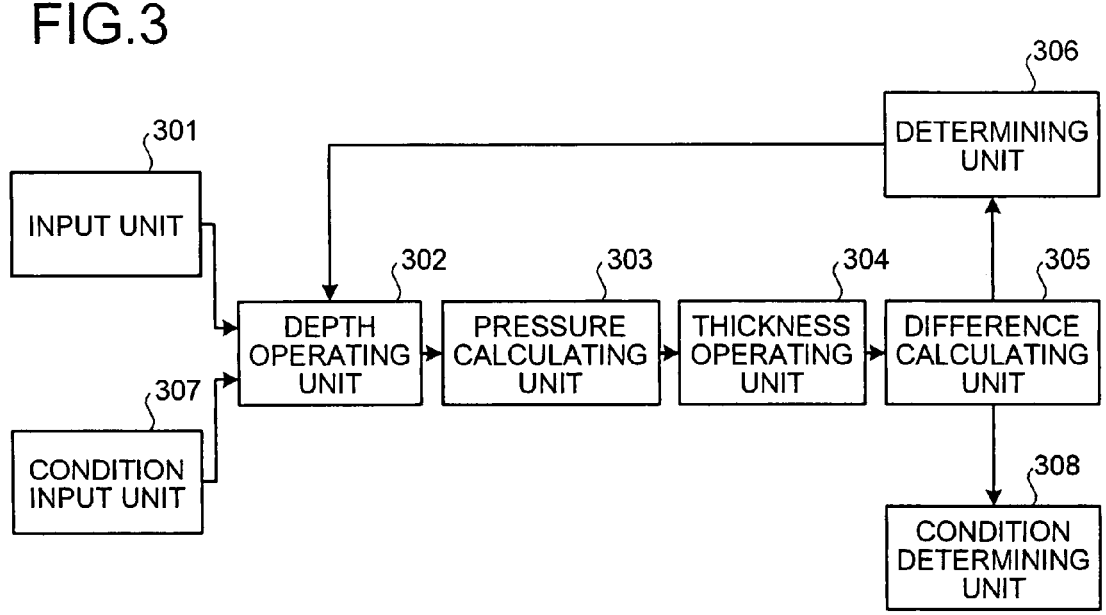
FIG. 3 is a block diagram of the polishing-condition predicting apparatus.

FIG. 3 is a block diagram of the polishing-condition predicting apparatus according to the embodiment of the present invention. As shown in FIG. 3, the polishing-condition predicting apparatus includes an input unit 301, a depth operating unit 302, a pressure calculating unit 303, a thickness operating unit 304, a difference calculating unit 305, a determining unit 306, a condition input unit 307, and a condition determining unit 308.

The polishing-condition predicting apparatus predicts a polishing condition in polishing a thin film to be formed on a substrate to be designed by means of a polisher by using a test substrate having a wiring groove formed into a predetermined shape. Specifically, the polishing-condition predicting apparatus predicts the polishing condition in polishing the thin film formed on the substrate to be designed by the CMP. The thin film formed on the substrate to be designed is made of, for example, copper or oxide. Here, the test substrate signifies a substrate for an evaluation such as a TEG having wiring grooves formed into various shapes. The TEG is described later.

The input unit 301 receives an input of a possible parameter of a wiring width in an arbitrary region of interest included in a groove depth function model expressing a maximum depth of the polisher entering into the groove in the region of interest on the thin film formed on the test substrate. Here, the arbitrary region of interest signifies an arbitrary fine region on the thin film formed on the test substrate.

In addition, the maximum depth of the polisher signifies a maximum depth at which the surface of the polisher (for example, polishing cloth) can enter in the groove in the region of interest during the polishing. Here, the groove depth function model is expressed by a mathematical equation of the maximum depth of the polisher by the use of dimensional data of the polishing pressure applied onto the thin film during the polishing, the relative speed between the thin film and the polisher, and the wiring width of the wiring groove formed on the test substrate.

The input unit 301 may receive inputs of possible parameters of the pressure applied onto the thin film formed on the test substrate and the relative speed between the thin film and the polisher, thereby using the parameters relevant to all of elements included in the groove depth function model.

The depth operating unit 302 substitutes the possible parameters input by the input unit 301 and the dimensional data of the wiring width into the groove depth function model, and then, operates a model value expressing the depth of the polisher entering into the groove in the region of interest and a region around the region of interest.

Here, the possible parameter may be a specific numeric value, may fall within a variable range of the parameter, or may be a condition of the possible parameter. For example, if a variable range of a parameter A is set to "0<A<100" and a condition is an "integer", the parameter A can take an integer from 1 to 99.

The dimensional data of the wiring width specifically signifies dimensional data of the wiring width of the wiring groove formed on the test substrate and an interval between adjacent wirings (i.e., wiring interval). The dimensional data may be input from the input unit 301 or may be recorded in the recording medium such as the HD 205 or the FD 207.

Specifically, the depth operating unit 302 substitutes the dimensional data of the various parameters and various wiring widths into the groove depth function model, thereby operating a model value according to the substituted parameter. That is to say, the depth operating unit 302 operates various model values expressing the depth of the polisher entering into the groove in the region of interest and the region around the region of interest by varying the substituted parameter.

The pressure calculating unit 303 substitutes the model values of the region of interest and the region therearound operated by the depth operating unit 302 into a pressure function model expressing a pressure in each of the regions by the height of the region concerned, thereby calculating a pressure to be applied to the region of interest.

The pressure function model expressing the pressure in each of the regions by the height of the region concerned is expressed by a mathematical equation, in which a pressure in a certain region is represented by a difference in height from a peripheral region and a distance from the peripheral region.

The thickness operating unit 304 substitutes the pressure to be applied to the region of interest calculated by the pressure calculating unit 303 into a speed function model expressing a polishing speed in polishing the thin film, thereby operating the thickness of the thin film in the region of interest after the polishing. The polishing speed during the polishing is proportional to the pressure to be applied onto the thin film and the relative speed between the surface of the thin film and the polisher.

As a consequence, the speed function model expressing the polishing speed in polishing the thin film is represented by the pressure to be applied onto the thin film and the relative speed between the surface of the thin film and the polisher. Specifically, a Preston expression, for example, may be used as the speed function model. The thickness of the thin film signifies the height of the thin film from the surface of the substrate and the depth of the groove formed on the thin film.

The difference calculating unit 305 calculates a difference between the thickness of the thin film in the region of interest operated by the thickness operating unit 304 and an actually measured thickness of the thin film in the region of interest after the polishing. The actually measured thickness of the thin film in the region of interest after the polishing may be recorded in the form of a table in the recording medium such as the HD 205 or the FD 207, thus to be read out only in calculating the difference from the result operated by the thickness operating unit 304.

Specifically, the difference calculating unit 305 calculates a difference between an actually measured thickness of the thin film in positionally the same region on the test substrate as the region of interest, in which the thickness of the thin film is calculated by the thickness operating unit 304, that is, in a region having the same dimensional data on a wiring width and a wiring interval, and the result operated by the thickness operating unit 304. More specifically, the difference calculating unit 305 compares the result operated by the thickness operating unit 304 with an actually measured result, and then, calculates a difference between the two results.

The determining unit 306 determines an optimum allowable one out of the parameters based on the result calculated by the difference calculating unit 305. Specifically, the determining unit 306 may determine an optimum parameter resulting from the operation by the depth operating unit 302 when the result calculated by the difference calculating unit 305 becomes minimum. In other words, since the difference is smallest at the smallest result calculated by the difference calculating unit 305, a parameter at this time is regarded as an optimum parameter.

The condition input unit 307 receives an input of a possible parameter of the polishing condition in polishing the thin film formed on the substrate to be designed. The parameter relevant to the polishing condition, for example, signifies the polishing pressure to be applied onto the thin film formed on the substrate to be designed, the relative speed between the surface of the thin film and the polisher, and the polishing time.

Furthermore, the depth operating unit 302 substitutes the possible parameter input by the condition input unit 307, the optimum value determined by the determining unit 306, and the dimensional data of the wiring width in an arbitrary region of interest on the thin film formed on the substrate to be designed (hereinafter, "region of interest on a substrate to be designed") into the groove depth function model, thereby operating model values expressing the depths of the polisher entering into the groove in the region of interest and the region around the region of interest on the substrate to be designed.

Specifically, the depth operating unit 302 operates the model values expressing the depths of the polisher entering into the groove in the region of interest and the region around the region of interest on the substrate to be designed by using the optimum value determined by the determining unit 306 according to each of the parameters relevant to the polishing condition input by the condition input unit 307.

Moreover, the pressure calculating unit 303 substitutes the model values in and around the region of interest on the substrate to be designed, which are operated by the depth operating unit 302, into the pressure function model, thereby calculating the pressure to be applied to the region of interest on the substrate to be designed.

Additionally, the thickness operating unit 304 substitutes the pressure to be applied to the region of interest on the substrate to be designed, which is calculated by the pressure calculating unit 303, into the speed function model, thereby operating the thickness of the thin film in the region of interest on the substrate to be designed.

In addition, the difference calculating unit 305 calculates the difference between the thickness of the thin film in the region of interest on the substrate to be designed, which is calculated by the thickness operating unit 304, and a value set as the thickness of the thin film in the region of interest on the substrate to be designed. Specifically, the difference calculating unit 305 calculates the difference between a value set as the thickness of the thin film in positionally the same region on the substrate to be designed as the region of interest on the substrate to be designed, in which the thickness of the thin film is calculated by the thickness operating unit 304, and the operation result by the thickness operating unit 304.

The value set as the thickness of the thin film in the region of interest on the substrate to be designed signifies a desired thickness of the thin film after the polishing, and it can be arbitrarily set. Furthermore, the value set as the thickness of the thin film in the region of interest on the substrate to be designed may be input by the input unit 301 or may be recorded in the recording medium such as the HD 205 and the FD 207. Particularly, the thin film in the region of interest on the substrate to be designed may have, for example, a height H on the substrate to be designed of 300±20 nanometers (nm) and a groove depth of ±30 nm.

The condition determining unit 308 determines a possible parameter input by the condition input unit 307 as the optimum parameter. Specifically, the condition determining unit 308 determines a possible parameter as the optimum parameter based on the result calculated by the difference calculating unit 305.

More specifically, the condition determining unit 308 may determine, as an optimum value, the parameter, based on which the depth operating unit 302 performs the operation, when the result calculated by the difference calculating unit 305 becomes minimum. In other words, the thin film can be polished in a thickness most approximate to the thickness of the thin film in the region of interest on the substrate to be designed when the result calculated by the difference calculating unit 305 becomes minimum, so that the parameter at this time is determined as the optimum value.

Incidentally, the CPU 201 executes a program recorded in the recording medium such as the ROM 202, the RAM 203, the HD 205 or the HD 207, shown in FIG. 2, thereby fulfilling their functions of the input unit 301, the depth operating unit 302, the pressure calculating unit 303, the thickness operating unit 304, the difference calculating unit 305, the determining unit 306, the condition input unit 307, and the condition determining unit 308, described above.

Figure 4:
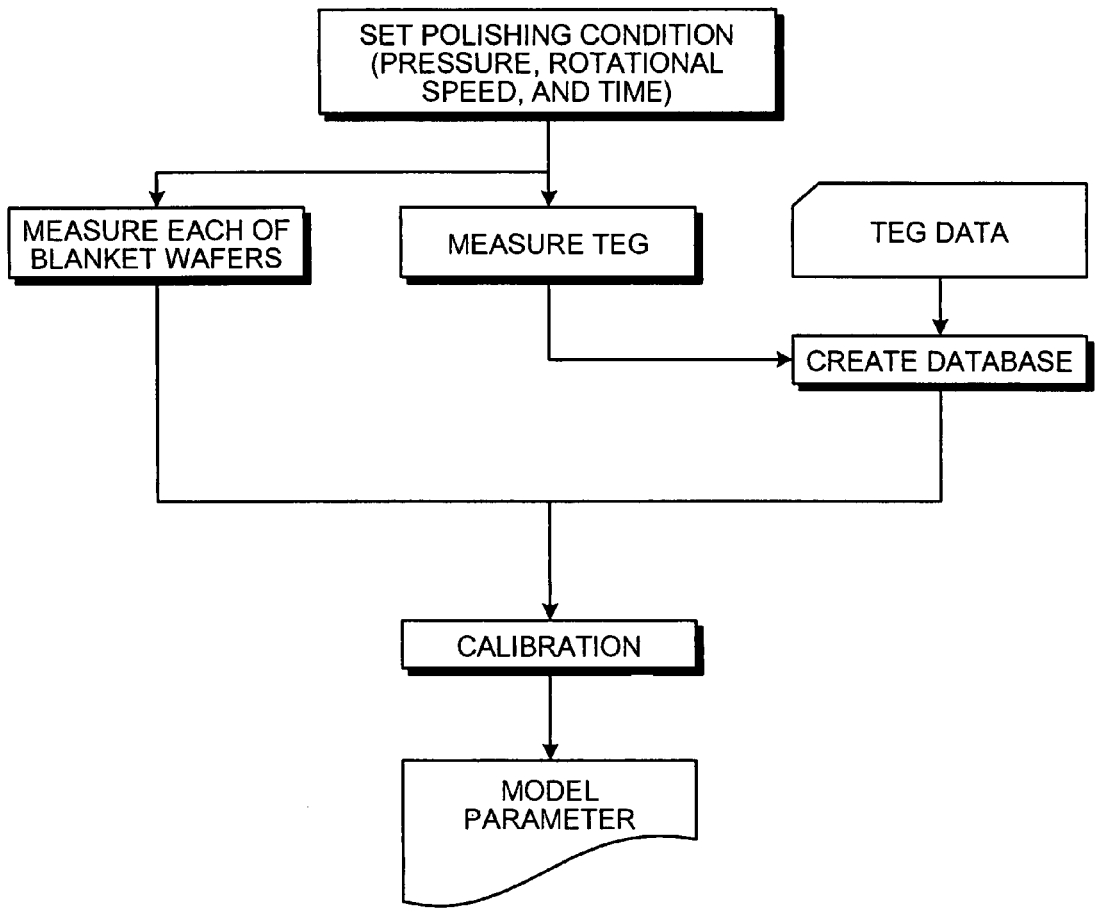
FIG. 4 illustrates an outline of polishing condition prediction according to the embodiment.

Next, the outline of polishing condition prediction according to the embodiment of the present invention is explained below. FIG. 4 illustrates an outline of polishing condition prediction according to the embodiment of the present invention.

<Calibration>

In predicting the polishing condition, a model parameter included in the model function for use in a polishing simulation is extracted by calibration, as shown in FIG. 4. The polishing simulation is adapted to determine as to how the thin film is polished under a predetermined polishing condition by simulation. First, the polishing condition for the calibration is set.

The polishing condition herein signifies a condition for polishing a blanket wafer and a TEG, described later. Specifically, the polishing condition is determined based on the polishing time, the polishing pressure, and the polishing rotational speed. The polishing time, the polishing pressure, and the polishing rotational speed can be set to various values, respectively. Furthermore, the polishing condition includes a condition for designating a region to be measured out of the TEG in TEG measurement, described later.

Subsequently, the polishing speed for each of the blanket wafers is calculated. Here, the blanket wafer is a wafer for an evaluation, having a thin film made of a single material (copper or oxide) over the entire substrate. The polishing speed with respect to each of the materials can be calculated based on the measurement result after the blanket wafer is polished under the polishing condition.

Specifically, the polishing speeds with respect to each of the materials are calculated under the various polishing conditions (the polishing rotational speed and the polishing pressure), respectively, based on the measurement result of the blanket wafer and the Preston equation (Equation 1). In Equation 1, reference character L designates a polishing quantity of a material to be polished (hereinafter, "the polishing speed"); reference character $\eta$ denotes a constant of each of the materials called a Preston constant; reference character P designates a polishing pressure; reference character V denotes a relative speed (a contact relative speed between a polisher and a material to be polished); and reference character t designates a polishing time. Here, Equation 1 is equivalent to the speed function model.

$$L = \eta P V t \quad (1)$$

Figures 5, 6:
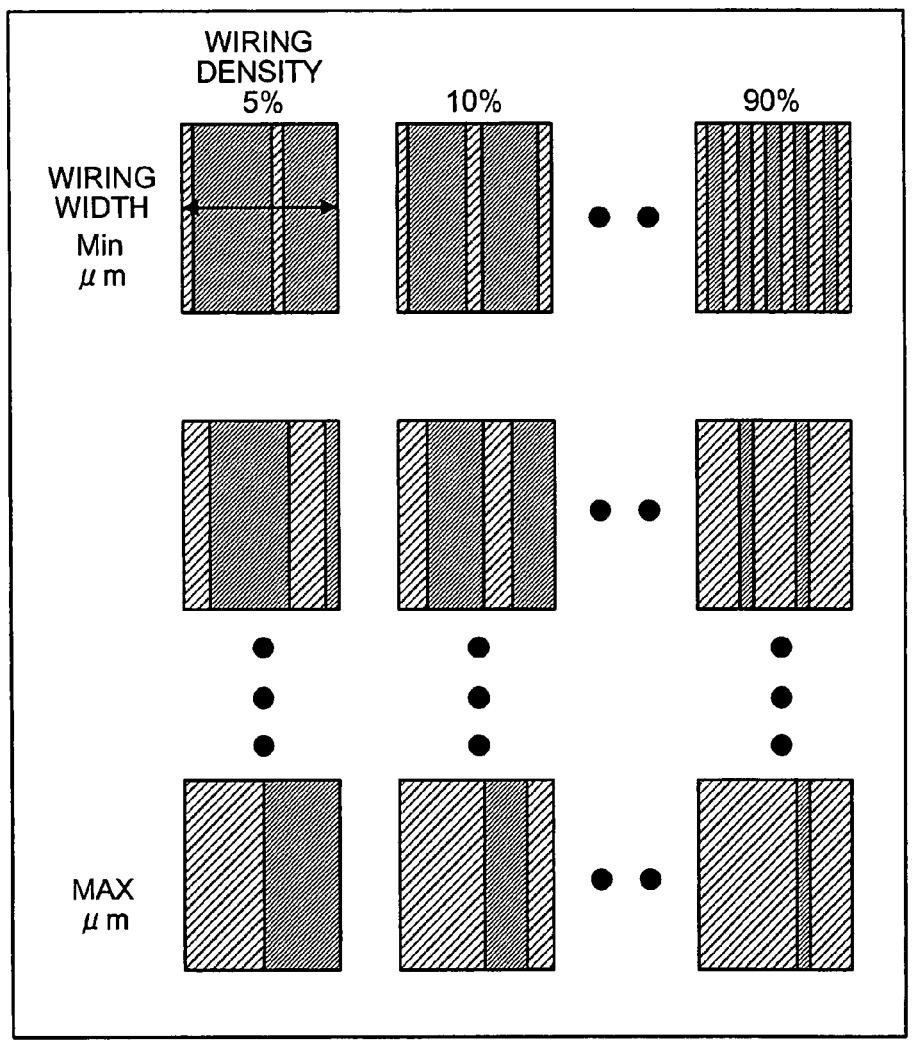
FIG. 5 is a table showing one example of a measurement result of a blanket wafer.
FIG. 6 is a schematic for explaining one example of a TEG.

The calculation of the polishing speed in a blanket wafer having a copper thin film formed thereon is explained in reference to FIG. 5. FIG. 5 is a table showing one example of the measurement result of the blanket wafer.

A table 500 of FIG. 5 shows measurement results (i.e., the heights H) when a blanket wafer having a thin film (i.e., copper plating) over the entire surface of a substrate is polished under various polishing conditions. The height H represents an absolute height from a main surface of a substrate (surface of a substrate having neither an oxide film nor copper plating formed thereon).

The constant $\eta$ of each of the materials (copper) is obtained and the polishing speed L is calculated by substituting the measurement result shown in the table 500 to Equation 1. Here, the relative speed V in Equation 1 can be obtained based on, for example, the polishing rotational speed and the dimensional data on the polisher, such as a polishing pad. Specifically, a local relative speed V between a polishing pad and the thin film (i.e., copper plating) is obtained based on the polishing rotational speed (i.e., rotational speed).

As a consequence, the polishing speeds L can be determined according to the materials forming the thin films under the various polishing conditions, respectively. Particularly, a polishing quantity of the copper plating ground for 1 minute under a certain polishing condition becomes a calculation result at a polishing speed L of 200 micron/min.

In the meantime, the height H of the copper plating and the groove depth S before and after the polishing are measured by using the TEG having modules arranged in various wiring widths and densities. The TEG is a test substrate for evaluation produced for the purpose of the evaluation of the material, basic design and basic process of the semiconductor circuit or of check of a failure mechanism.

FIG. 6 is a schematic for explaining one example of the TEG. In the TEG shown in FIG. 6, the copper plating is formed on wiring patterns arranged in various wiring widths and densities. The height H of the copper plating and the groove depth S are actually measured in the various wiring widths and densities by using the TEG.

A width between adjacent wiring grooves (i.e., an interval between the wirings) can be obtained based on the wiring width and density. Here, a wiring interval is explained in a wiring width of 1 micrometer and a wiring density of 75%. In this case, since the wiring density in a certain region is 75%, the ratio of the wiring width to the interval between the wirings becomes 1:3. Based on this ratio, the interval between the wirings can be expressed by an equation: 1×3=3 micrometers, that is, it becomes triple the wiring width.

Figure 7:
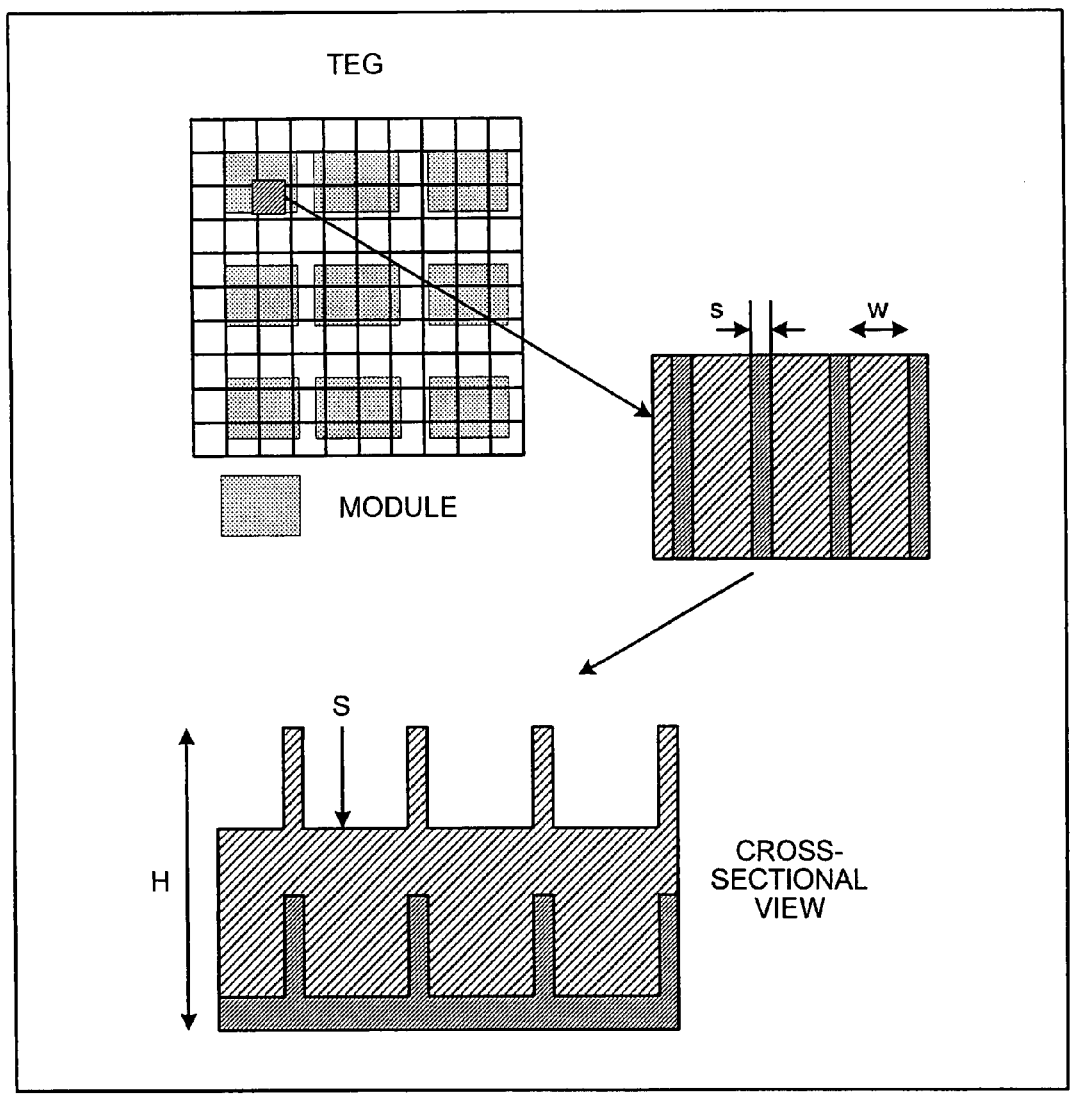
FIG. 7 is a schematic for explaining another example of the TEG having modules arranged in various wiring widths w and various wiring intervals s.

Hereinafter, the TEG having the modules arranged in the various wiring widths and densities. FIG. 7 is a schematic for explaining another example of the TEG having the modules arranged in various wiring widths w and various wiring intervals s. As shown in FIG. 7, the modules are arranged in the various wiring widths w and the various wiring intervals s on the TEG partitioned in a mesh-like manner.

In the meantime, wiring grooves are formed in the various wiring widths w and the various wiring intervals s also in a region, in which no module is arranged on the TEG, covered with the copper plating. And then, the height H of the copper plating and the groove depth S on the TEG having the modules arranged thereon and the height H of the copper plating and the groove depth S between the modules are actually measured under the various polishing conditions (the polishing pressure, the polishing rotational speed, and the polishing time), respectively.

FIG. 8 is a table showing one example of a TEG measurement result. In FIG. 8 actual measurement data on the height H of the copper plating on the TEG and the groove depth S is shown. In other words, In FIG. 8 the actual measurement data on modules MOD1, MOD2, . . . arranged on the TEG and between the modules on the TEG is shown. The TEG measurement is carried out before and after the polishing, thereby preparing the TEG measurement results shown in FIG. 8 according to the polishing conditions.

Next, an actual measurement DB relating to the TEG is created based on the TEG measurement result and the TEG data. The TEG data is data in, for example, a GDSII format, and includes therein the dimensional data, such as a position, a wiring width and a wiring density on the TEG, on the wiring pattern formed on the TEG.

FIG. 9 is a table showing one example of a data structure of the actual measurement DB. As shown in FIG. 9, the actual measurement data on the TEG partitioned in the mesh-like manner is stored in each of the meshes in the actual measurement DB. An area around the member to be polished also required to be accurately recognized to predict the polishing condition required for uniformly polishing the surface of the substrate. In view of this, the TEG is partitioned in the mesh-like manner, thereby preparing the actual measurement data on each of the meshes.

In particular, the wiring width w, wiring interval s, height H and groove depth S of each of the meshes are stored in the actual measurement DB. A position of each of the meshes on the TEG is expressed by coordinates (x, y).

The height H of the copper plating and the groove depth S in the actual measurement DB can be obtained from the TEG measurement result shown in FIG. 8. For example, the actual measurement data shown in FIG. 8 is assigned to the height H of the copper plating and the groove depth S in a mesh region corresponding to the module arranged on the TEG. Similarly, the actual measurement data shown in FIG. 8 is assigned to the height H of the copper plating and the groove depth S in a region between the modules.

Incidentally, the heights H of the copper plating and the groove depths S in all of the regions partitioned in the mesh-like manner may be actually measured, and then, the actual measurement DB may be created based on the actual measurement result.

The wiring width w and the wiring interval s in the actual measurement DB may be obtained by using TEG data including the dimensional data on the TEG, as shown in FIG. 6. Specifically, the wiring interval is calculated based on the wiring width and the wiring density, as described above, thereby determining an average wiring width and an average wiring interval. The resultant values are stored as the wiring width w and the wiring interval s in the actual measurement DB.

The actual measurement DB is created according to each of the polishing conditions, and includes the actual measurement data before and after the polishing. When there are a plurality of polishing steps since the thin film is made of a plurality of materials, the actual measurement data before and after the polishing may be provided in each of the steps. In this case, a model parameter may be adjusted in each of the steps.

Subsequently, the calibration is carried out by using the model function expressing the pressure to be applied to each of the meshes on the TEG and the model function expressing the polishing pad entering in the groove, thereby extracting optimum model parameters (A, α, β, γ, δ, and ε, which will be described later) in obtaining the polishing condition.

The model function expressing the polishing pressure to be applied to each of the meshes on the TEG is explained below. A polishing pressure Pi applied to a region i on the TEG is represented by a value obtained by adding a value expressing an influence by the height in a region around the region i to a polishing pressure Po applied to the entire TEG.

Namely, the polishing pressure Pi is expressed by Equation 2 below. In Equation 2, reference character A denotes a model parameter; reference character h designates the height of the region; and reference character f denotes a stress function. The stress function f is proportional to a distance between a region j and the region i, and therefore, it is expressed by a Gauss function. The polishing pressure applied to each of the meshes on the TEG can be obtained based on Equation 2. Equation 2 is equivalent to the pressure function model.

$$P_i = (A(h_i - \Sigma f_{i-j}(h_j)) + P_o) \quad (2)$$

Next, the model function expressing the polishing pad entering in the groove is explained below. As the model function expressing the polishing pad entering in the groove is used $\alpha w^\beta s^\gamma P^\delta V^\epsilon$ expressing a maximum depth, in which the polishing pad can be entering in the groove. The expression of the maximum depth, in which the polishing pad can be entering in the groove, is equivalent to the groove depth function model.

Thereafter, the polishing is simulated by using the model function expressing the pressure to be applied to each of the meshes on the TEG and the model function expressing the polishing pad entering in the groove, so that the grinding of the surface of the TEG is simulated (known technique: T. Tugbawa, Chip-Scale Modeling of Pattern Dependencies in Massachusetts Institute of Technology, 2002, Section 3).

Figure 10:
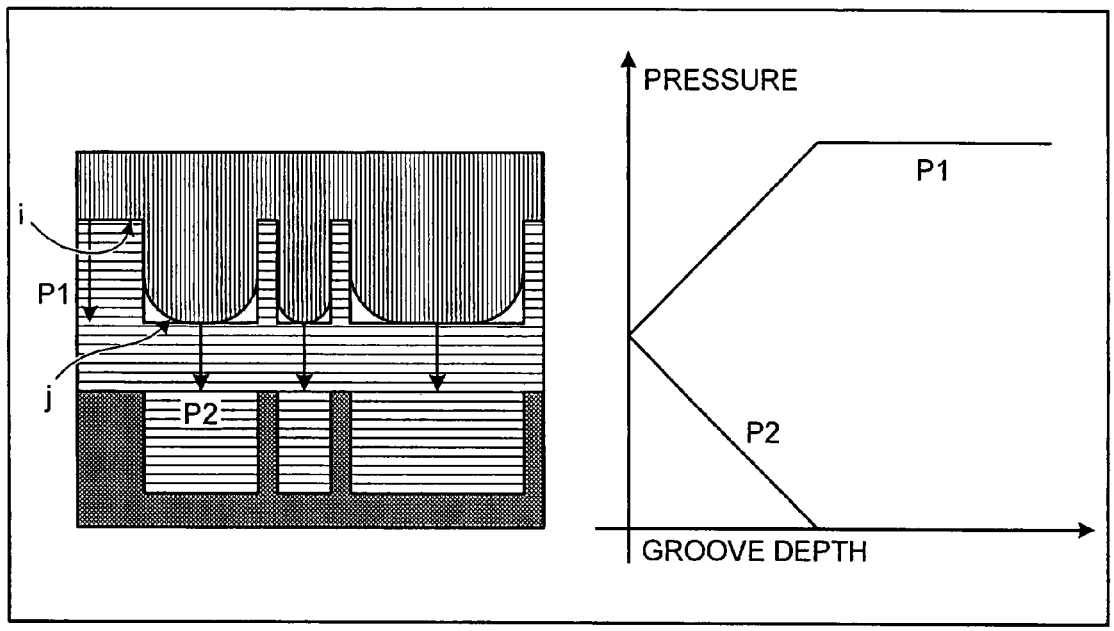
FIG. 10 is a schematic for explaining a relationship between a depth of a polishing pad entering a groove and a polishing pressure.

The polishing simulation is specifically explained below. First, the relationship between the depth of the polishing pad entering in the groove and the polishing pressure is explained. FIG. 10 is a schematic for explaining the relationship between the depth of the polishing pad entering in the groove and the polishing pressure. In FIG. 10, when, for example, the depth of the polishing pad entering in the groove is maximum, that is, is expressed by $\alpha w^\beta s^\gamma P^\delta V^\epsilon$, a pressure P2 applied to the region j becomes "0" while the pressure P1 applied to the region i becomes maximum. The region i corresponds to the region of interest: in contrast, the region j corresponds to the peripheral region.

In this manner, the polishing pressure in each of the regions on the TEG is obtained by using $\alpha w^\beta s^\gamma P^\delta V^\epsilon$ expressing the maximum depth of the polishing pad entering in the groove and Equation 2, and then, the polishing speed L at each of the polishing pressures is calculated. As a consequence, the polishing quantity in each of the regions (or meshes) on the TEG is obtained by integration based on the calculation result.

Next, the optimum model parameters A, α, β, γ, δ, and ε determining the polishing condition are extracted based on the actual measurement values stored in the actual measurement DB and the polishing simulation results.

For example, to match the actual measurement data after the polishing stored in the actual measurement DB with the polishing simulation result, the model parameters A, a, β, γ, δ, and ε are variously changed within a predetermined range, and as a result, values with smallest differences are extracted as the optimum model parameters. A difference calculating method includes a method for obtaining a root mean of differences between the actual measurement data and the simulation results at a plurality of typical points on the TEG (for example, the modules).

More specifically, the values P and V are first fixed, and then, the optimum parameters are extracted by varying α, β, and γ by using the actual measurement DB (before and after the polishing) at two different polishing times. Next, the value V and the polishing time are fixed, and then, δ is combined by using the actual measurement DB having two different values P (after polishing). Finally, the values A and ε may be obtained.

The values A, α, β, γ, δ, and ε such extracted as described above and the constant η of the polishing speed of each of the materials are regarded as the model parameters. When the thin film is formed on the substrate with a plurality of kinds of materials, the model parameters may be obtained according to the number of steps since the polishing steps are performed a plurality of times.

<Polishing Condition Predicting Simulation>

Figure 11:
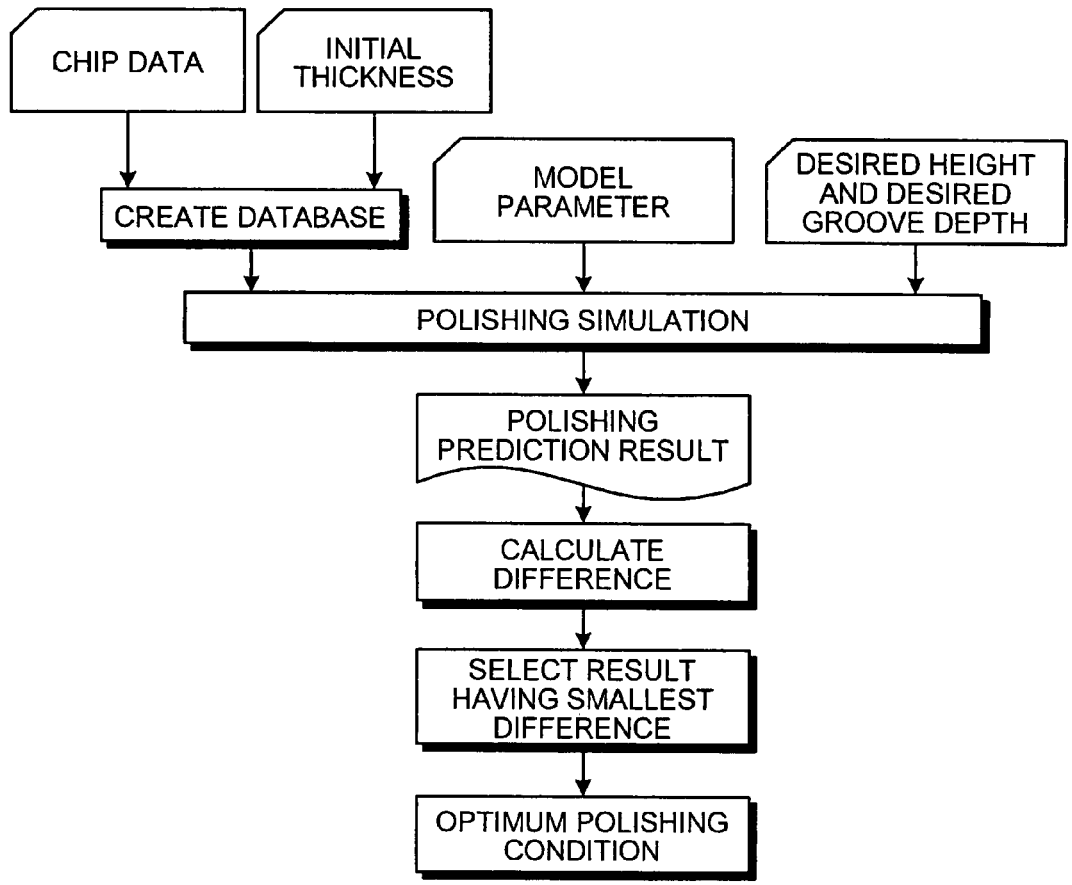
FIG. 11 illustrates an outline of polishing condition prediction according to the embodiment.

Next, the polishing condition prediction is simulated, thereby obtaining an optimum polishing condition. FIG. 11 illustrates an outline of polishing condition prediction according to the embodiment. Chip data on a chip to be simulated (for example, in a GDSII format) and a desired height and a desired groove depth of plating after the polishing are first prepared to simulate the polishing condition prediction.

And then, a simulation DB is created based on the chip data and an initial thickness of the plating before the chip to be simulated. FIG. 12 a table showing one example of the data structure of the simulation DB.

As shown in FIG. 12, the wiring width w and wiring interval s of the chip to be simulated, and the plating height H, and the groove depth S in each of the regions partitioned in the mesh-like manner are stored in the simulation DB.

The wiring width w and the wiring interval s stored in the simulation DB can be obtained based on the information on the chip data, like in obtaining the wiring width w and the wiring interval s in the actual measurement DB, as described above. The plating height H expressing the initial thickness of the plating before the polishing and the groove depth S may be a value obtained based on a thickness predicting simulation, in which a thickness of the thin film to be formed on the substrate is predicted, or may be an actually measured value.

A desired height of the plating and a desired groove depth after the polishing can be arbitrarily set by a user. For example, the plating height H in each of the regions may be set to 300±20 nm, and further, the groove depth of the plating may be set to ±30 nm.

Thereafter, the polishing simulation is carried out by using the data stored in the simulation DB, thereby predicting a plating height H and a groove depth S after the polishing. Specifically, the polishing simulation is carried out by variously changing the polishing pressure, polishing rotational speed and polishing time included in the polishing conditions, thereby calculating a difference between the simulation result (that is, the polishing prediction result) and the desired height and groove depth. Here, the difference may be calculated by, for example, using a root mean of differences between the polishing prediction results and the desired heights and groove depths in the regions on the chip.

In this manner, the polishing simulation is carried out under the various polishing conditions, thus searching the polishing condition having a smallest difference, under which the optimum polishing prediction result can be produced. The polishing condition when the polishing prediction result having the smallest difference is achieved is output as the optimum polishing condition.

Since the model parameters included in the model function used at this time are values extracted by the calibration, the polishing simulation can be carried out with substantially the actual measurement.

As described above, the polishing condition capable of obtaining the desired height of the thin film formed on the substrate and the desired groove depth can be predicted by using the simulation model capable of predicting the variations in the polishing time, polishing pressure, and polishing rotational speed. In particular, the height and groove depth of the thin film can be optimized in consideration of the polishing pad entering into the groove in polishing the thin film, thus accurately predicting the polishing condition.

Figure 13:
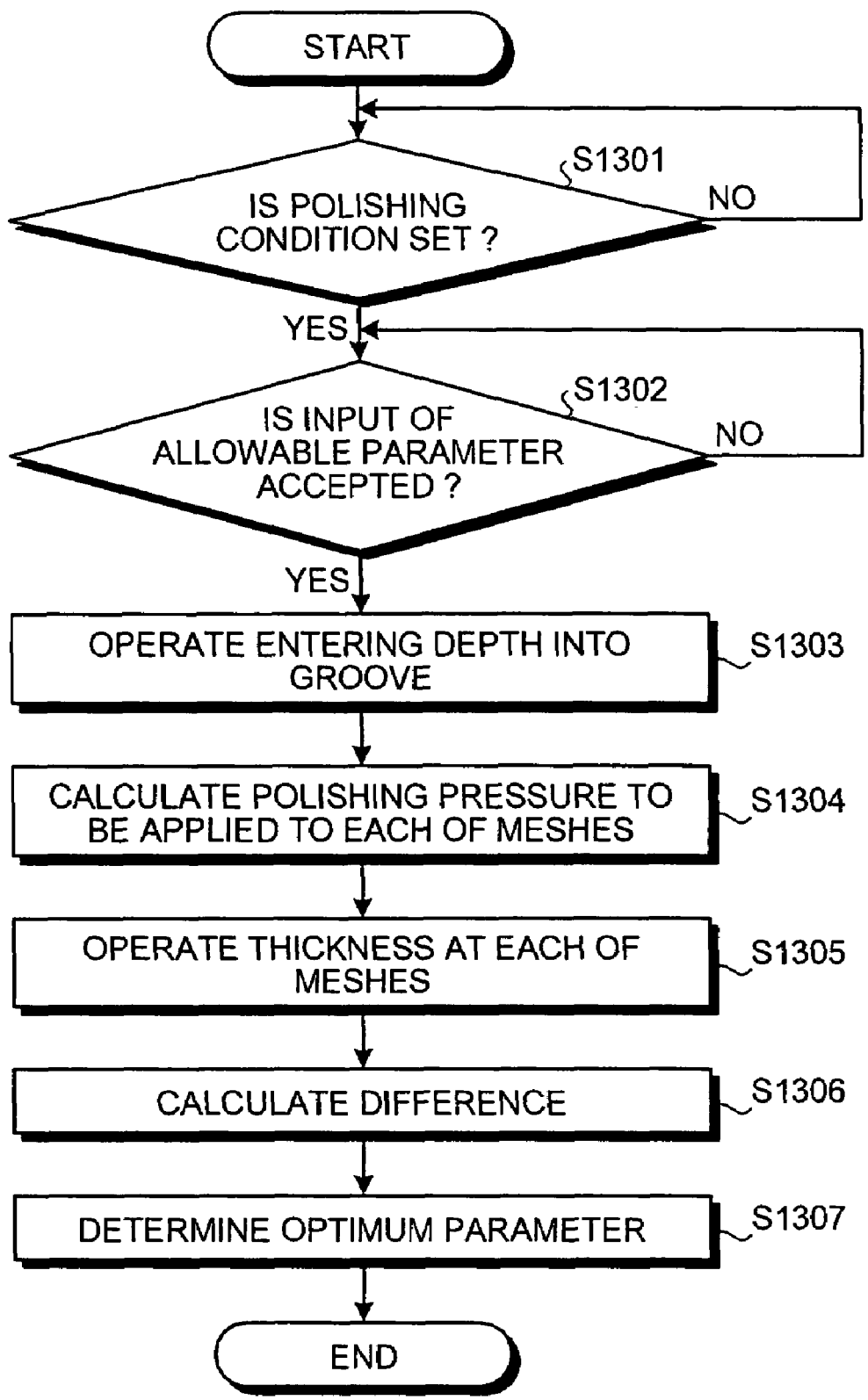
FIG. 13 is a flowchart of a polishing-condition prediction process performed by the polishing-condition predicting apparatus.

Subsequently, a polishing-condition prediction process performed in a polishing-condition predicting apparatus is explained in reference to FIGS. 13 and 14. FIG. 13 is a flowchart of a polishing-condition prediction process that is performed in the polishing-condition predicting apparatus; and FIG. 14 is a flowchart of the polishing-condition prediction process performed by the polishing-condition predicting apparatus. The prediction of the polishing condition in polishing the copper plating formed on the substrate is explained below. Here, the thickness signifies the height of the copper plating formed on the substrate and the groove depth.

In the flowchart of FIG. 13, the polishing-condition predicting apparatus first judges as to whether the polishing condition for calibration is set (step S1301). The polishing condition includes the polishing pressure, the polishing rotational speed, and the polishing time in polishing the TEG, which can be arbitrarily set, respectively. Moreover, the polishing condition set herein may one or two or more.

As soon as the polishing condition is set after waiting for the setting of the polishing condition (YES in step S1301), it is next judged as to whether the input of the possible parameter is accepted (step S1302). In other words, the possible parameters are included in the various function models for use in the polishing-condition prediction process. Here, the parameters include A, α, β, γ, δ and ε.

Furthermore, the possible parameter signifies a specific numeric value or a condition for the possible parameter. The possible parameters may be input one by one with respect to each of the parameters, or a parameter file or the like having various parameters described therein may be input.

In step S1302, as soon as the possible parameter is input after waiting for the inputting of the possible parameter (YES in step S1302), the depth entering in the groove at the copper plating surface in each of the meshes on the TEG is calculated (step S1303). That is to say, the entering depth is calculated by substituting the input possible parameter (α, β, γ, δ and ε) and the polishing condition set in step S1301 into the function model ($\alpha w \beta s \gamma P \delta V \epsilon$) expressing the maximum depth of the polishing pad entering into the groove.

More specifically, the dimensions w and s relating to the wiring width at each of the meshes are specified based on the position of each of the meshes on the TEG. Thereafter, the entering depth is calculated by substituting the specified dimensions into the function model. The dimensional data on the wiring width at each of the meshes on the TEG is acquired from, for example, the actual measurement DB shown in FIG. 9.

Thereafter, the polishing pressure to be applied to each of the meshes is calculated based on the operation result of each of the meshes operated in step S1303 (step S1304). In particular, the polishing pressure to be applied to each of the meshes is calculated by substituting the depth entering in the groove at each of the meshes into Equation 2, as expressed above.

Reference character h in Equation 2 is expressed by, for example, "h=H (see FIG. 9): the depth entering in the groove". In other words, the polishing pressure can be calculated by substituting the operation result into Equation 2.

Subsequently, the thickness of the copper plating at each of the meshes can be operated by substituting the polishing pressure calculated in step S1304 into the function model expressing the polishing speed with respect to the copper plating (step S1305). Specifically, the polishing quantity at each of the meshes is obtained based on the calculation result calculated by substituting the polishing pressure to be applied to each of the meshes into S1303 is determined as the optimum parameter.

In this manner, the optimum parameters included in the various function models for use in predicting the polishing condition can be obtained.

Next, the processing when the polishing condition is predicted by using the determined optimum parameters is explained. In the flowchart of FIG. 14, the polishing-condition predicting apparatus first determines as to whether the possible parameter relevant to the polishing condition in polishing the copper plating formed on the substrate to be designed is input (step S1401).

The input possible parameter relevant to the polishing condition signifies a value expressing the polishing condition in actually polishing the copper plating formed on the substrate to be designed. A specific parameter serving as a candidate of a polishing condition may be input, or a searching range of the polishing condition may be input.

As soon as the possible parameter relevant to the polishing condition is input after waiting for the inputting of the possible parameter (YES in step S1401), the depth of the surface of the copper plating entering into the groove at each of the meshes on the substrate to be designed is calculated (step S1402). The entering depth is calculated by substituting the parameter relevant to the input polishing condition, that is, the parameters relevant to the polishing pressure and polishing rotational speed, and the optimum parameters determined in step S1307 of FIG. 13 that is, the optimum parameters relevant to $\alpha$, $\beta$, $\gamma$, $\delta$ and $\epsilon$ into the function model ($\alpha w \beta s \gamma P \delta V \epsilon$) expressing the maximum depth of the polishing pad entering into the groove.

More specifically, the dimensions w and s relating to the wiring width at each of the meshes are specified based Equation 1 and the polishing time set in step S1301, thereby operating the thickness of the copper plating after the polishing.

Here, the function model expressing the polishing speed may be such configured as to be read from the recording medium such as the HD 205 and the FD 207 or to be input with the possible parameter in step S1302. Otherwise, the function model expressing the polishing speed may be such configured that the variable $\eta$ in the function model expressing the polishing speed is calculated based on the table 500 shown in FIG. 5 and a process for determining the polishing speed is added.

Next, the difference between the thickness of the copper plating at each of the meshes operated in step S1305 and the actually measured thickness of the copper plating formed on the TEG after the polishing is calculated (step S1306). For example, the difference is calculated by comparing the thicknesses of the copper platings at the corresponding meshes on the TEG with each other based on the actual measurement DB shown in FIG. 9.

In the difference calculating method, the root mean of the differences (or the differences) calculated at the meshes may be obtained. At this time, the differences with respect to all of the meshes on the TEG are not calculated, but a typical mesh on the TEG, for example, the module shown in FIG. 7 may be selected, so that a difference may be calculated.

Finally, the parameter with the minimum difference calculated in step S1306 is determined as the optimum parameter (step S1307), thus completing a series of processings in this flowchart. Specifically, the parameter substituted into the function model expressing the maximum depth of the polishing pad entering in the groove in step on the position of each of the meshes on the substrate to be designed. Thereafter, the entering depth is calculated by substituting the specified dimensions into the function model. The dimensional data on the wiring width at each of the meshes on the substrate to be designed is acquired from, for example, the simulation DB shown in FIG. 12.

Thereafter, the polishing pressure to be applied to each of the meshes is calculated based on the operation result of each of the meshes operated in step S1402 (step S1403). In particular, the polishing pressure to be applied to each of the meshes is calculated by substituting the depth entering in the groove at each of the meshes and the optimum parameter A into Equation 2, as expressed above.

Reference character h in Equation 2 is expressed by, for example, "h=H (see FIG. 12): the depth entering in the groove". In other words, the polishing pressure can be calculated by substituting the operation result into Equation 2.

Subsequently, the thickness of the copper plating at each of meshes can be operated by substituting the polishing pressure calculated in step S1403 into the function model expressing the polishing speed with respect to the copper plating (step S1404). Specifically, the polishing quantity at each of the meshes is obtained based on the calculation result calculated by substituting the polishing pressure to be applied to each of the meshes into Equation 1 and the parameter relevant to the polishing condition, that is, the parameter relevant to the polishing time, input in step S1401, thereby operating the thickness of the copper plating after the polishing.

Here, the function model expressing the polishing speed may be such configured as to be read from the recording medium such as the HD 205 and the FD 207 or to be input with the possible parameter of the polishing condition.

Next, the difference between the thickness of the copper plating at each of the meshes operated in step S1404 and the desired thickness of the copper plating formed on the substrate to be designed after the polishing is calculated (step S1405). The desired thickness of the copper plating formed on the substrate to be designed may be read from the values previously stored in the recording medium such as the HD 205 and the FD 207 or may be input with the possible parameter relevant to the polishing condition.

The desired thickness signifies, for example, the height H of the copper plating formed on the substrate to be designed of 300±20 nanometers or the groove depth of the copper plating of ±30 nanometers. The difference is calculated by comparing the thicknesses of the copper platings at the corresponding meshes on the substrate to be designed with each other based on the simulation DB (after polishing) shown in FIG. 12.

In a difference calculating method, the root mean of the differences (or differences) calculated at the meshes may be used. At this time, the differences with respect to all of the meshes on the substrate to be designed are not calculated, but a typical mesh on the substrate to be designed, for example, the module shown in FIG. 7 may be selected, so that a difference may be calculated. Otherwise, only the calculation result satisfying the desired thickness, for example, out of the calculated differences may be recorded in the recording medium such as the HD 205 and the FD 207.

Finally, the parameter relevant to the polishing condition with the minimum difference calculated in step S1405 is determined as the optimum polishing condition (step S1406), thus completing a series of processings in this flowchart.

For example, when the possible parameter relevant to the polishing condition input in step S1401 may take a plurality of values, all of the possible parameters are subjected to the processing from step S1402 to step S1405. Therefore, the differences under the various polishing conditions are calculated. After the differences with respect to all of the possible parameters are calculated, the parameter relevant to the polishing condition with the smallest difference out of the calculation results is determined as the optimum polishing condition.

In this manner, the polishing condition in polishing the copper plated surface formed on the substrate to be designed can be predicted in consideration of the variations of the polishing pressure, polishing rotational speed, and polishing time. Thus, the polishing-condition predicting apparatus according to the embodiment of the present invention can provide the polishing condition capable of polishing the copper plating formed on the substrate to be designed in the desired height value and the desired groove depth or an approximate height and an approximate groove depth.

As described above, the polishing condition expressed by the height of the thin film formed on the substrate to be designed and the groove depth by using the function model in consideration of the variations of the polishing time, polishing pressure, and polishing rotational speed can be predicted by the polishing condition predicting program, the recording medium, the polishing-condition predicting apparatus and the polishing condition predicting method.

In particular, the height of the thin film and the groove depth can be optimized in consideration of the polishing pad entering into the groove in polishing the thin film, thereby predicting the polishing condition more accurately. Thus, the design period can be shortened, the work labor can be alleviated, and further, the yield at the time of the LSI fabrication can be enhanced.

Furthermore, early appearance of a product of a good quality on the market can produce a high advantage in securing a great share on the market in fabricating a product at an initial stage from introduction to growth.

Incidentally, the polishing-condition predicting apparatus according to the embodiment can be implemented by executing a program prepared in advance by a computer such as a personal computer or a work station. Such a program is recorded in a recording medium such as a hard disk, a flexible disk, a CD-ROM, an MO or a DVD that can be read by a computer, and therefore, is read from the recording medium by the computer, thus to be executed. In the meantime, such a program may be a transfer medium that can be distributed via a network such as the Internet.

According to the embodiments described above, it is possible shorten the design time, to reduce the work load, and to enhance yield at the time of the LSI fabrication.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a polishing-condition predicting program for predicting a polishing condition by using a test substrate having a wiring groove formed in a predetermined shape, the polishing condition in polishing a thin film formed on a substrate by a polisher, the polishing-condition predicting program causing a computer to execute:

receiving a possible value of parameters of a wiring width in a region of interest on a thin film formed on the test substrate, the parameter values included in a groove depth function model expressing a maximum depth at which a polisher enters into the groove in the region;

calculating a depth model value expressing a depth at which the polisher enters into the groove in the region and an adjacent region thereof by substituting the possible parameter and dimensional data of the wiring width into the groove depth function model;

calculating a pressure to be applied to the region by substituting the model values of the region and the adjacent region into a pressure function model expressing pressure by height of the thin film in each region;

calculating thickness of the thin film in the region after the polishing by substituting the calculated pressure into a speed function model expressing a polishing speed;

calculating a difference between the calculated thickness and an actual thickness of the thin film measured in the region after the polishing; and determining an optimum value for the parameters of the wiring width based on a result of calculation at the calculating a difference.

2. The computer-readable recording medium according to claim 1, wherein the polishing-condition predicting program further causes the computer to execute receiving possible values of parameters of the pressure applied on the thin film of the test substrate and a relative speed between the thin film and the polisher.

3. The computer-readable recording medium according to claim 1, wherein the determining includes determining a possible value from which a smallest value is derived in calculation of the difference, as the optimum value for the parameters of the wiring width.

4. The computer-readable recording medium according to claim 1, wherein the polishing-condition predicting program further causes the computer to execute:

receiving a second possible value of parameters of the polishing condition;

calculating a depth model value expressing a depth at which the polisher enters into the groove in the second region and a second adjacent region thereof on the substrate by substituting the second possible value, the optimum value determined at the determining, and dimensional data of a wiring width in a second region of interest on the thin film on the substrate into the groove depth function model;

calculating a second pressure to be applied to the second region by substituting the model value of the second region and the second adjacent region, into the pressure function model;

calculating a second thickness of the thin film in the second region by substituting the second pressure into the speed function model;

calculating a second difference between the second thickness and a value set as thickness of the thin film in the second region; and determining an optimum value for the parameters of the polishing condition based on the second difference.

5. The computer-readable recording medium according to claim 4, wherein the parameters of the polishing condition includes parameters of the pressure to be applied on the thin film formed on the substrate, the relative speed between the surface of the thin film on the substrate and the polisher, and polishing time.

6. The computer-readable recording medium according to claim 4, wherein the determining an optimum value for the parameters of the polishing condition includes determining a possible value from which a smallest value is derived in calculation of the second difference, as the optimum value for the parameters of the polishing condition.

7. A polishing-condition predicting apparatus that predicts a polishing condition by using a test substrate having a wiring groove formed in a predetermined shape, the polishing condition in polishing a thin film formed on a substrate by a polisher, the polishing-condition predicting apparatus comprising:

a receiving unit that receives a possible value of parameters of a wiring width in a region of interest on a thin film formed on the test substrate, the parameter values included in a groove depth function model expressing a maximum depth at which a polisher enters into the groove in the region;

a depth calculating unit that substitutes the possible parameter and dimensional data of the wiring width into the groove depth function model, to calculate a model value expressing a depth at which the polisher enters into the groove in the region and an adjacent region thereof;

a pressure calculating unit that substitutes the model values of the region and the adjacent region into a pressure function model expressing pressure by height of the thin film in each region, to calculate a pressure to be applied to the region;

a thickness calculating unit that substitutes the calculated pressure into a speed function model expressing a polishing speed, to calculate thickness of the thin film in the region after the polishing;

a difference calculating unit that calculates a difference between the calculated thickness and an actual thickness of the thin film measured in the region after the polishing; and a determining unit that determines an optimum value for the parameters of the wiring width based on a result of calculation by the difference calculating unit.

8. The polishing-condition predicting apparatus according to claim 7, wherein the receiving unit further receives possible values of parameters of the pressure applied on the thin film of the test substrate and a relative speed between the thin film and the polisher.

9. The polishing-condition predicting apparatus according to claim 7, wherein the determining unit determines a possible value from which a smallest value is derived in calculation of the difference, as the optimum value for the parameters of the wiring width.

10. The polishing-condition predicting apparatus according to claim 7, further comprising:

a condition receiving unit that receives a second possible value of parameters of the polishing condition; and a condition determining unit that determines the second possible value as an optimum value for the parameters of the polishing condition, wherein the depth calculating unit substitutes the second possible value, the optimum value determined by the determining unit, and dimensional data of a wiring width in a second region of interest on the thin film on the substrate into the groove depth function model, to calculate a model value expressing a depth at which the polisher enters into the groove in the second region and a second adjacent region thereof on the substrate, the pressure calculating unit substitutes the model value of the second region and the second adjacent region, into the pressure function model, to calculate a second pressure to be applied to the second region, the thickness calculating unit substitutes the second pressure into the speed function model, to calculate a second thickness of the thin film in the second region, the difference calculating unit calculates a second difference between the second thickness and a value set as thickness of the thin film in the second region, and the condition determining unit determines an optimum value for the parameters of the polishing condition based on the second difference.

11. The polishing-condition predicting apparatus according to claim 10, wherein the parameters of the polishing condition includes parameters of the pressure to be applied on the thin film formed on the substrate, the relative speed between the surface of the thin film on the substrate and the polisher, and polishing time.

12. The polishing-condition predicting apparatus according to claim 10, wherein the condition determining unit determines a possible value from which a smallest value is derived in calculation of the second difference, as the optimum value for the parameters of the polishing condition.

13. A polishing-condition predicting method of predicting a polishing condition by using a test substrate having a wiring groove formed in a predetermined shape, the polishing condition in polishing a thin film formed on a substrate by a polisher, the polishing-condition predicting method comprising:

receiving a possible value of parameters of a wiring width in a region of interest on a thin film formed on the test substrate, the parameter values included in a groove depth function model expressing a maximum depth at which a polisher enters into the groove in the region;

calculating a depth model value expressing a depth at which the polisher enters into the groove in the region and an adjacent region thereof by substituting the possible parameter and dimensional data of the wiring width into the groove depth function model;

calculating a pressure to be applied to the region by substituting the model values of the region and the adjacent region into a pressure function model expressing pressure by height of the thin film in each region;

calculating thickness of the thin film in the region after the polishing by substituting the calculated pressure into a speed function model expressing a polishing speed;

calculating a difference between the calculated thickness and an actual thickness of the thin film measured in the region after the polishing; and determining an optimum value for the parameters of the wiring width based on a result of calculation at the calculating a difference.

14. The polishing-condition predicting method according to claim 13, further comprising receiving possible values of parameters of the pressure applied on the thin film of the test substrate and a relative speed between the thin film and the polisher.

15. The polishing-condition predicting method according to claim 13, wherein the determining includes determining a possible value from which a smallest value is derived in calculation of the difference, as the optimum value for the parameters of the wiring width.

16. The polishing-condition predicting method according to claim 13, further comprising:

receiving a second possible value of parameters of the polishing condition;

calculating a depth model value expressing a depth at which the polisher enters into the groove in the second region and a second adjacent region thereof on the substrate by substituting the second possible value, the optimum value determined at the determining, and dimensional data of a wiring width in a second region of interest on the thin film on the substrate into the groove depth function model;

calculating a second pressure to be applied to the second region by substituting the model value of the second region and the second adjacent region, into the pressure function model;

calculating a second thickness of the thin film in the second region by substituting the second pressure into the speed function model;

calculating a second difference between the second thickness and a value set as thickness of the thin film in the second region; and determining an optimum value for the parameters of the polishing condition based on the second difference.

17. The polishing-condition predicting method according to claim 16, wherein the parameters of the polishing condition includes parameters of the pressure to be applied on the thin film formed on the substrate, the relative speed between the surface of the thin film on the substrate and the polisher, and polishing time.

18. The polishing-condition predicting method according to claim 16, wherein the determining an optimum value for the parameters of the polishing condition includes determining a possible value from which a smallest value is derived in calculation of the second difference, as the optimum value for the parameters of the polishing condition.

* * * * *